March 10, 1964  O. FREUDENSCHUSS  3,124,033
CONTROL ARRANGEMENT FOR THE DIAPHRAGM OF A PHOTOGRAPHIC
OR CINEMATOGRAPHIC TAKING OBJECTIVE
Filed Feb. 6, 1962  2 Sheets-Sheet 1
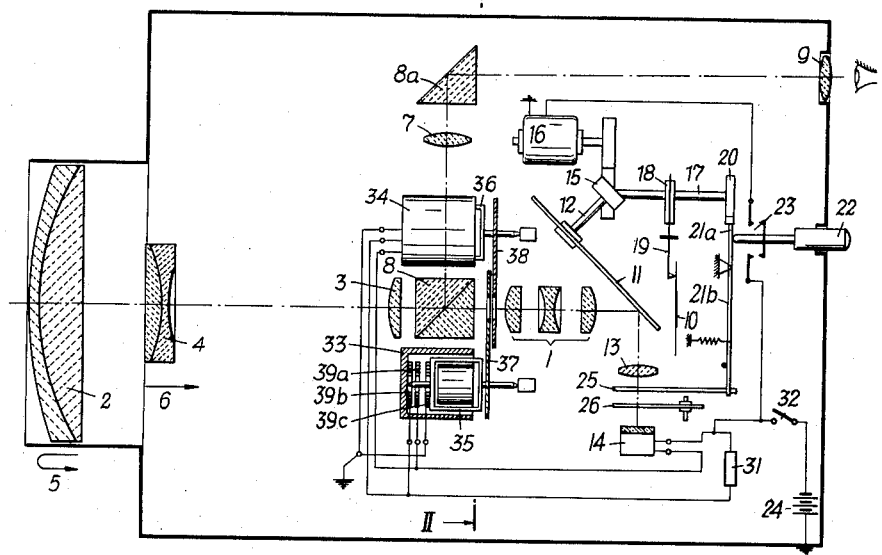
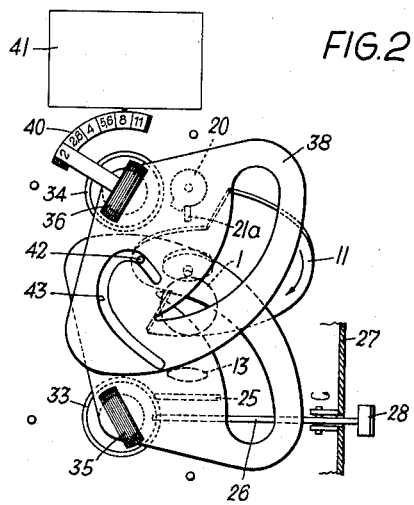

March 10, 1964     O. FREUDENSCHUSS     3,124,033
CONTROL ARRANGEMENT FOR THE DIAPHRAGM OF A PHOTOGRAPHIC
OR CINEMATOGRAPHIC TAKING OBJECTIVE
Filed Feb. 6, 1962     2 Sheets-Sheet 2

United States Patent Office 3,124,033
Patented Mar. 10, 1964

3,124,033
CONTROL ARRANGEMENT FOR THE DIAPHRAGM OF A PHOTOGRAPHIC OR CINEMATOGRAPHIC TAKING OBJECTIVE
Otto Freudenschuss, Vienna, Austria, assignor to Karl Vockenhuber and Christl Hauser, both of Vienna, Austria
Filed Feb. 6, 1962, Ser. No. 171,416
Claims priority, application Austria Feb. 17, 1961
13 Claims. (Cl. 88—16)

The present invention relates to a control arrangement for the diaphragm of a photographic or cinematographic taking objective comprising at least one galvanometer without restoring springs which controls the blades of the objective diaphragm, and a photo resistor arranged in the path of rays of the objective, respectively, in an equivalent path of rays behind the galvanometer-controlled diaphragm. By equivalent path of rays, a path of rays is understood, which is directed to the object to be imaged by the taking objective and the section of which may be varied in dependence on the adjusting movement of the galvanometer in the same ratio as the section of the taking path of rays.

It is an object of the present invention to provide a control arrangement for the diaphragm of a photographic or cinematographic taking objective, which arrangement has a higher sensitivity than the hitherto suggested arrangements at a lower current consumption.

It is a further object of the present invention to provide a combination between the new arrangement and the objective of a camera in such manner that light measurement is made through the taking objective, so that the angle of measurement roughly corresponds with the shooting angle of the camera.

It is a further object of the present invention to provide the diaphragm control arrangement with means effecting a gradual opening or stopping down of the objective diaphragm.

It is still a further object of the present invention to use the galvanometer of the diaphragm control arrangement even for the control of the voltage of the current supply.

With these and other objects in view, which will become apparent in the following detailed description, the present invention will be clearly understood in connection with the accompanying drawings, in which:

FIGURE 1 is a schematic section through a substandard film camera comprising a varifocal objective and an automatic diaphragm control;

FIGURE 2 is a section along the lines 2—2 of FIG. 1;

Figure 3:
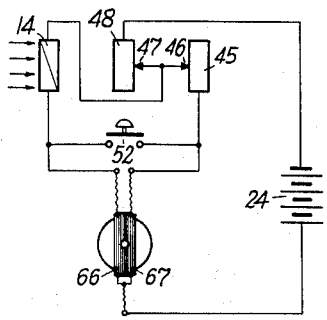
FIGS. 3 to 6 illustrate circuit diagrams of further embodiments of the diaphragm control.

Referring now to the drawings, and in particular to FIGS. 1 and 2, the substandard film camera illustrated in FIG. 1 has a basic objective 1 in front of which an optical system of variable magnification is arranged. This optical system consists of two positive elements 2 and 3 and a negative element 4 arranged between those two positive elements 2 and 3. The objective elements 2 and 4 are displaced for a variation of the focal length of the total objective according to two different laws of motion (see arrows 5 and 6). By a partly mirror-coated prism 8, a portion of the light incident through the objective is reflected to the viewfinder and forming an image through a lens 7, a prism 8a, and an eyepiece 9. Between the film 10 and the objective is provided a shutter 11 which is rotatable about a shaft 12 that is set at an angle of 45° against the optical axis. When the shutter 11 rotates, the film is intermittently released to exposure. During the intermittent feed of the film 10 the same is covered by the shutter 11. That side of the shutter 11 that faces the objective is mirror-coated so that with covered film the light incident through the objective is reflected and guided through a lens 13 to a photo resistor 14.

The shutter 11 is driven by an electromotor 16 over a gearing 15. On the gear shaft 17 is provided a cam 18 controlling the feeding-claw 19. The gear shaft 17 further carries a locking disc 20 that coacts with the arm 21a of a two-armed lever. In the shown position the arm 21a is in mesh with the locking disc 20 and locks thereby the shutter 11 with the film gate covered. By pressing the release key 22 the lever 21a is shifted from the locking disc 20 and simultaneously the switch 23 is closed and the motor 16 connected to the battery 24. The motor starts and moves the claw 19 and the shutter 11. By pressing the release key 22, the lever arm 21b is also turned in anti-clockwise direction and pulls back from the path of rays a grey filter 25 arranged between the lens 13 and the photo resistor 14, so that the light falls unimpaired on the photo resistor 14 when the camera is in its operative position. After releasing the release key 22, the two-armed lever 21a and 21b is reset by a spring 21c engaging the lever arm 21b to its starting position, the motor circuit is interrupted and the shutter 11 arrested in front of the film gate. The decrease of the medium value of the light reflected by the shutter 11 with the camera operating is compensated by retracting the grey filter 25 out of the path of the rays. In the illustrated embodiment, the shutter aperture and the shutter blade have approximately the same extension (see FIG. 2). Therefore the grey filter 25 must have a filter factor of about 0.5, so that the light, falling on the photo resistor 14 with arrested shutter, is reduced to approximately one half. A second grey filter disc 26 that is arranged to be rotatable in front of the photo resistor 14, the sectors of that grey filter disc 26 having different filter steps. The filter disc 26 is rotatable by means of a crossbar 28 protruding from the camera casing 27 and serves for adjustment of the various film speeds.

The diaphragm blades 37 and 38 are controlled by two galvanometers 33 and 34 without directive force, that is, without restoring springs. The coils 35 and 36 of the two galvanometers 33 and 34 have two coaxial windings 66 and 67 (FIGS. 3, 4 and 6) which are wound in opposite sense. The coils coaxially surround the core of a permanent magnet. The magnetic short circuit is effected by the galvanometer casing that consists of ferromagnetic material. The current supply to the galvanometer coils 35 and 36 takes place by means of thin, helically wound gold foils 39a, 39b, 39c which for themselves offer but an extremely low directing moment. The remaining directing moment is excluded by the fact that the spiral 39c having the larger section and thereby having also the greater remaining directing moment is in contradistinction to the spirals 39a and 39b wound in the opposite sense of coiling. The photo resistor 14 is connected in series with the winding 66 of the galvanometer, and a fixed set comparison resistor 31 is disposed in the circuit of the winding 67.

The circuit is energized by the motor battery 24. The diaphragm control and the camera drive may be disconnected from the battery 24 by the main switch 32. The diaphragm blades 37 and 38 are adjusted by the galvanometer systems until the magnetic balance is obtained in the coil windings 66 and 67, i.e. until the ampere-turns in the two branches amount to the same number. The arrangement operates with a fixed resistance of the photo resistor 14, thus making possible an especially easy compensation of divergences in the characteristic curves of the individual photo resistances.

In contradistinction to the hitherto customary diaphragm control systems with photo resistors a special battery having a high voltage constancy is not required, as the battery voltage does not enter the result of measurement but influences only the sensitivity of the circuit. The circuit may be energized by the battery of the driving motor, the voltage of said battery exceeding by far the voltage of the otherwise customary button cells. As the current consumption is low compared to the capacity of the motor battery, a special switch that is coupled with the release key may be dispensed with. It will do to break the circuit by means of the main switch 32 after having finished filming work.

As regards manufacturing, the new arrangement brings about advantages since calibrating the galvanometer is not necessary and no accuracy is claimed either from the diaphragm blades.

Moreover, in connection with varifocal objectives the advantage results that the field of measurement of the exposure control always corresponds to the field of view. Since with up-to-date variofocal objectives with a focal ratio of 1:6 the field of view is variable according to the ratio 1:36, with constant field of measurement of the exposure control considerable errors in diaphragm setting might arise.

Referring now to FIG. 3, a circuit diagram of a modified diaphragm control arrangement is disclosed.

Deviating from the first embodiment the photo resistor does not operate on a fixed point of its characteristic curve, but the working point differs as to the set film speed. The setting of the film speed and eventually of the frame frequency is effected by means of the resistor 45, on which is adjustable a slider 46. The resistor 45 is constructed with a logarithmic course of resistance, so that on adjustment of the diaphragm control by 1 degree DIN (⅓ diaphragm stop), the slider must be displaced by a substantially constant way.

Figure 4:
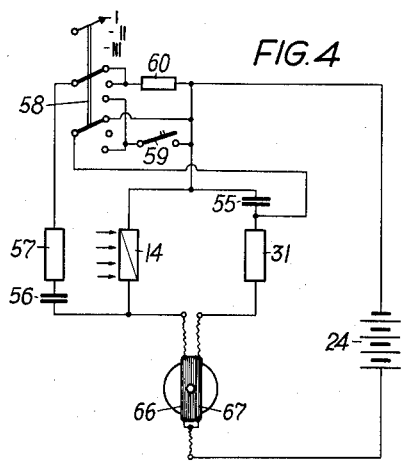

The slider 46 is constructively combined with a slider 47 of a resistor 48, the terminal of which is connected to the battery clip. By means of this variable resistor 48 the internal resistance of the total control circuit is increased in the range of the maximum sensitivity of the circuit, so that the current consumption in this range is decreased. The two branches of the circuit may be connected by a switch 52. On the premises of the same number of ampere-turns of the two galvanometer coils, the magnetic balance is effected in the windings 66, 67 of the coils by closing the switch 52. By pressing the switch the automatically set diaphragm may be locked. Referring now to FIG. 4, a development of the circuit illustrated in FIG. 1 is disclosed. A capacitor 55 is provided in series with the resistor 31, a capacitor 56 and a resistor 57 are provided in parallel to the photo resistor 14. The switching-on of the capacitors 55 and 56 is made over a bipolar switch 58 and has the following effect: if—starting from the illustrated switch position I—the switch is moved to the position II, the short-circuiting circuit of the capacitor 55 is broken. The capacitor 55 is charged, the diaphragm control circuit being detuned thereby in the sense of a gradual stopping down of the objective diaphragm. In case two scenes are to be faded, the film is rewound after the complete stopping down of the diaphragm, the light-tight closed diaphragm preventing an exposure during the rewinding. Before starting the next scene the switch 58 is changed over to III. The capacitor remains in operation and the objective diaphragm is stopped down. Simultaneously with operating the camera release key the switch 59 is closed, the capacitor 55 short-circuited, and the capacitor 56 with the resistor 57 switched on in parallel to the photo resistor 14. The slowly subsiding charging current of the capacitor 56 results in a gradual opening of the objective diaphragm. In the stationary phase the capacitor exerts no influence on the exposure control. After setting back the switch 58 to the position I the capacitor 56 is discharged over the highly-resistant resistor 60.

Figure 5:
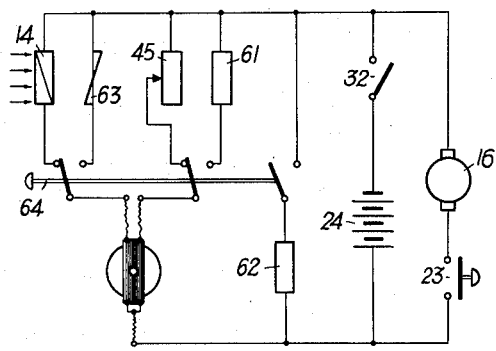

Referring now to FIG. 5, a circuit diagram for checking the voltage of the battery 24 is disclosed. Besides, the exposure control arrangement, that substantially corresponds to the one shown in FIG. 3, a further circuit is provided, which consists of a fixed resistor 61 and a varistor or VDR resistor 63, i.e. of a voltage dependent resistor. The voltage control arrangement may be connected to the galvanometer windings by a switch 64. A low-resistance resistor 62 serves as loading resistance for the battery during voltage control. The circuit arrangement is mounted in such a way that the galvanometer is balanced, if the battery has the minimum voltage required for reaching the standard motor speed.

In case the voltage amounts to a higher value, the current prevails in the one branch, in case the voltage amounts to a lower value, the current prevails in the other galvanometer winding. As the galvanometers 33 and 34 have no directive force, the coils are in the one or other end position so that an especially clear indication is made possible.

Figure 6:
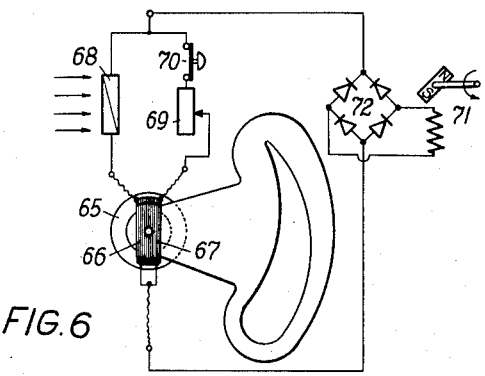

Deviating from the above shown embodiments, according to FIG. 6, the current supply to the diaphragm control is effected by a miniature alternating-current generator 71 over a rectifier 72, the generator 71 being driven by the camera drive. As the diaphragm control is not sensitive to voltage, arrangements for attaining a constant supply voltage may be dispensed with. In the circuit of the coil winding 66 is provided a photo resistor 68, in the circuit of the winding 67 is provided a resistor 69 on which the film speed and the frame frequency may be adjusted. In the circuit of that resistor 69 is further provided a switch 70 on operation of which the objective diaphragm is lighttight stopped down.

The present invention is not restricted to the illustrated embodiments. It is possible e.g. to use as light-sensitive unit a photo diode or a photo transistor. For reflecting the light for the light-sensitive unit is also possible to use a partly mirrored prism or a mirror. The present embodiments may be even modified in such a respect that the light for the light-sensitive unit is not reflected out of the path of rays of the objective, but that a special objective with an adjustable diaphragm is connected in series with the light-sensitive unit. The diaphragm blades for the camera objective and the measuring objective are driven by at least one joint galvanometer without directive force. In an advantageous development the blades of the objective diaphragm have prolongations which define the diaphragm apertures for the measuring objective. With such an arrangement no change in the setting occurs in releasing the camera. Thus, a respective compensating arrangement may be dispensed with.

While I have disclosed several embodiments of the present invention, it is to be understood that these embodiments are given by example only and not in a limiting sense, the scope of the present invention being determined by the objects and the claims.

I claim:

1. In a control arrangement for the diaphragm of a photographic or cinematographic taking objective, the combination of an objective, diaphragm blades provided within said objective and adapted to control the light incident through said objective, a photo resistor arranged to receive light incident through said objective and controlled by said diaphragm blades, a comparison resistor, a galvanometer comprising a permanent magnet and coordinated to each of said diaphragm blades, a rotatable coil arranged in the field of said permanent magnet, two coaxial windings within said coil wound in opposite directions, at least three current-carrying wires of soft metal connecting said two windings with fixed terminals, said wires being arranged in such a way that they exert no restoring moment to said galvanometer coil upon turning the latter, a source of current, two circuits energized by said source of current, one of said two circuits including one of said two coaxial windings of said galvanometer coil and the other of said two circuits including the other of said two coaxial windings of said galvanometer coil, a first of said two circuits including said photo resistor, a second of said two circuits including said comparison resistor, the said galvanometer being in driving connection with said diaphragm blades, said galvanometer being adapted to effect an increase of the aperture determined by said diaphragm blades when the light impinging on said photo resistor is decreased and increased, respectively, due to an unbalance of ampere turns in said two windings of said galvanometer coil, in the stationary condition the ampere turns in both said windings being equal.

2. In a control arrangement for the diaphragm of a photographic or cinematographic taking objective, the combinattion of an objective, diaphragm blades provided within said objective and adapted to control the light incident through said objective, a photo resistor arranged to receive light incident through said objective and controlled by said diaphragm blades, a mirror arranged in the path of rays of said objective reflecting light incident through said objective to said photo resistor, a comparison resistor, a galvanometer comprising a permanent magnet and coordinated to each of said diaphragm blades, a rotatable coil arranged in the field of said permanent magnet, two coaxial windings within said coil wound in opposite directions, at least three current-carrying wires of soft metal connecting said two windings with fixed terminals, said wires being arranged in such a way that they exert no restoring moment to said galvanometer coil upon turning the latter, a source of current, two circuits energized by said source of current, one of said two circuits including one of said two coaxial windings of said galvanometer coil and the other of said two circuits including the other of said two coaxial windings of said galvanometer coil, a first of said two circuits including said photo resistor, a second of said two circuits including said comparison resistor, said galvanometer being in driving connection with said diaphragm blades, said galvanometer being adapted to effect an increase of the aperture determined by said diaphragm blades when the light impinging on said photo resistor is decreased, and increased, respectively, due to an unbalance of ampere turns in said two windings of said galvanometer coil, in the stationary condition the ampere turns in both windings being equal, so that the light flux impinging on the said light-sensitive layer is constant in spite of changes in lighting conditions of an object to be photographed.

3. The diaphragm control arrangement, as set forth in claim 2, which includes a shutter adapted to periodically cover the said light-sensitive layer, a mirror being provided on said shutter and periodically reflecting light to said photo resistor when the said light-sensitive layer is covered by said shutter.

4. In a diaphragm control arrangement, the combination of an objective, diaphragm blades provided within said objective and adapted to control the light incident through said objective, a photo resistor arranged to receive light incident through said objective and controlled by said diaphragm blades, a comparison resistor, a galvanometer comprising a permanent magnet and coordinated to each of said diaphragm blades, a rotatable coil arranged in the field of said permanent magnet, two coaxial windings of equal numbers of turns wound in opposite directions, at least three current-carrying wires of soft metal connecting said two windings with fixed terminals, said wires being arranged in such a way that they exert no restoring moment to said galvanometer coil upon turning the latter, a source of current, two circuits energized by said source of current, one of said two circuits including one of said two coaxial windings of the galvanometer coil and the other of said two circuits including the other of said two coaxial windings of said galvanometer coil, a first of said two circuits including said photo resistor, a second of said two circuits including said comparison resistor, said galvanometer being in driving connection with said diaphragm blades, said galvanometer being adapted to bring about an increase of the aperture determined by said diaphragm blades when the light impinging on said photo resistor is decreased and increased, respectively, due to an unbalance of ampere turns in said two windings of said galvanometer coil, a switch adapted to connect the respective terminals of said two windings, thereby fixing a set diaphragm aperture independent of the prevailing light conditions.

5. The diaphragm control arrangement, as set forth in claim 1, which includes a switch provided in the circuit of one of said windings of said galvanometer coil and breaking said circuit on operation, so that said galvanometer causes said diaphragm blades to be moved to a final position.

6. The diaphragm control arrangement, as set forth in claim 1, which includes a switch provided in the circuit of one of said windings of said galvanometer coil and short-circuiting said circuit on operation, so that said galvanometer causes said diaphragm blades to be moved to a final position.

7. In a diaphragm control arrangement, the combination of an objective, diaphragm blades provided within said objective and adapted to control the light incident through said objective, a photo resistor arranged to receive light incident through said objective and controlled by said diaphragm blades, a comparison resistor, a galvanometer comprising a permanent magnet ond coordinated to each of said diaphragm blades, a rotatable coil arranged in the field of said permanent magnet, two coaxial windings within said coil wound in opposite directions, at least three current-carrying wires of soft metal connecting said two windings with fixed terminals, said wires being arranged in such a way that they exert no restoring moment to said galvanometer coil upon turning the latter, a source of current, two circuits energized by said source of current, one of said two circuits including one of said two coaxial windings of said galvanometer coil and the other of said two circuits including the other of said two coaxial windings of said galvanometer coil, a first of said two circuits including said photo resistor, a second of said two circuits including said comparison resistor, said galvanometer being in driving connection with said diaphragm blades, said galvanometer being adapted to effect an increase of the aperture determined by said diaphragm blades when the light impinging on said photo resistor is decreased and increased, respectively due to an unbalance of ampere turns in said two windings of said galvanometer coil, a capacitor and a switch in said circuit of one of said windings of said galvanometer coil in one of the positions of said switch the capacitor is made ineffective, in the operative position said capacitor is in action, said capacitor causing a gradual movement of said diaphragm blades to a final position.

8. The diaphragm control arrangement, as set forth in claim 7, which includes a cine-camera receiving said arrangement, release means for said camera, a further switch provided in said circuit of said capacitor and controlled by said release means of said camera.

9. The diaphragm control arrangement, as set forth in claim 1, which includes two additional circuits, a first of said two additional circuits including a voltage-dependent resistor, a second of said two additional circuits including a comparison resistor, a source of current energizing said two additional circuits, throw-over switches disposed in series with said two windings of said galvanometer coil, said switches connect in a first position said two windings with said photo resistor and said comparison resistor, respectively, said switches connect in a second position, said two windings with said voltage-dependent resistor and said comparison resistor, respectively, the latter being adjusted such, that, when the source of current shows a minimum operating voltage, the ampere turns of both of said windings are equal, said galvanometer moves said diaphragm blades to one end position on application of a higher voltage and to another end position on application of a lower voltage, and indicating means connected with said diaphragm blades indicating the position of the latter.

10. The diaphragm control arrangement, as set forth in claim 1, which includes grey filters in the path of rays between said objective and said photo resistor, and said grey filters are adjustable in dependence upon an exposure factor of the camera.

11. The diaphragm control arrangement, as set forth in claim 3, which includes a grey filter insertable in the path of rays between said objective and photo resistor, means inserting said grey filter in said path of rays when the said mirror-shutter is inoperative, further means for retracting said grey filter when said mirror-shutter is inoperative, the transmission factor of said grey filter being determined such that the average light fluxes incident on said photo resistor are equal to arresting and moving said mirror-shutter.

12. The diaphragm control arrangement, as set forth in claim 1, which includes a resistor displaced in series with said source of current and adjustable in accordance with the setting of the film speed, reducing the current consumption of said diaphragm control arrangement in the range of the maximum sensitivity of the same.

13. The diaphragm control arrangement, as set forth in claim 1, which includes a cine-camera receiving said arrangement, said cine-camera comprising a camera driving means, and said source of current of said diaphragm control arrangement is a miniature generator driven by said camera driving means.

References Cited in the file of this patent

UNITED STATES PATENTS

| | | |
|---|---|---|
| 1,980,217 | Moreno | Nov. 13, 1934 |
| 2,032,010 | Goodwin | Feb. 25, 1936 |
| 2,032,633 | Riszdorfer | Mar. 3, 1936 |
| 2,518,717 | Rath | Aug. 15, 1950 |
| 3,072,035 | Martin | Jan. 8, 1963 |
| 3,082,674 | Bagby | Mar. 26, 1963 |
| 3,085,487 | Akahane | Apr. 16, 1963 |